US 11,736,373 B2

(12) United States Patent
Fainberg

(10) Patent No.: US 11,736,373 B2
(45) Date of Patent: Aug. 22, 2023

(54) AGENTLESS NETWORK TRAFFIC MAPPING

(71) Applicant: FORESCOUT TECHNOLOGIES, INC., San Jose, CA (US)

(72) Inventor: Eli Fainberg, Tel Aviv (IL)

(73) Assignee: FORESCOUT TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 17/489,272

(22) Filed: Sep. 29, 2021

(65) Prior Publication Data

US 2023/0110265 A1  Apr. 13, 2023

(51) Int. Cl.
*G06F 15/173* (2006.01)
*H04L 43/062* (2022.01)
*H04L 41/22* (2022.01)
*H04L 43/0882* (2022.01)
*H04L 67/303* (2022.01)
*H04L 43/0811* (2022.01)

(52) U.S. Cl.
CPC .......... *H04L 43/062* (2013.01); *H04L 41/22* (2013.01); *H04L 43/0811* (2013.01); *H04L 43/0882* (2013.01); *H04L 67/303* (2013.01)

(58) Field of Classification Search
CPC .............................. H04L 43/062; H04L 41/22
USPC ................................. 709/223-225, 224-225
See application file for complete search history.

(56) References Cited

U.S. PATENT DOCUMENTS

| | | | |
|---|---|---|---|
| 9,088,606 B2* | 7/2015 | Ranum et al. | H04L 67/02 |
| 10,091,220 B2* | 10/2018 | Shabtai et al. | H04L 63/1416 |
| 10,324,747 B1* | 6/2019 | Chakraborty | G06F 11/321 |
| 10,735,269 B2* | 8/2020 | Wilson | G06F 16/2282 |
| 11,076,568 B2* | 8/2021 | van den Bosch | A01H 5/08 |
| 2013/0166711 A1* | 6/2013 | Wang et al. | G08B 13/19656 709/223 |
| 2013/0182700 A1* | 7/2013 | Figura et al. | H04L 43/04 709/224 |
| 2020/0097903 A1* | 3/2020 | Jung | H04N 5/913 |
| 2020/0296139 A1 | 9/2020 | Fainberg et al. | |
| 2021/0105191 A1* | 4/2021 | Yang et al. | H04L 67/101 |

FOREIGN PATENT DOCUMENTS

CA    3114333 A1    4/2020

OTHER PUBLICATIONS

ETSI GS NFV-SEC 013, "Network Functions Virtualisation (NFV) Release 3; Security; Security Management and Monitoring specification", Feb. 2017, Sophia Antipolis Cedex, France.
International Search Report and Written Opinion of Application no. PCT/US2022/045280, mailed Jan. 16, 2023, 9 pages.

* cited by examiner

*Primary Examiner* — Duyen M Doan
(74) *Attorney, Agent, or Firm* — Womble Bond Dickinson (US) LLP

(57) ABSTRACT

Systems, methods, and related technologies for generating a network traffic map based on network traffic information and additional data are described. Network traffic information may be obtained from endpoints using an operating system (OS) interface, without an agent being installed on the endpoints. A network traffic map may be generated for the network based on the network traffic information.

20 Claims, 6 Drawing Sheets

AGENTLESS NETWORK TRAFFIC MAPPING

TECHNICAL FIELD

Aspects and implementations of the present disclosure relate to network monitoring, and more specifically, determining network traffic mapping without an agent.

BACKGROUND

A computer network can include computing devices that share resources by communicating with each other using communication protocols. The computing devices can be communicatively coupled to each other or network-dedicated devices, over physically wired, optical, and wireless radio-frequency technology. A computer network can have a variety of network topologies. Communications between devices on a network can be referred to as network traffic. As technology advances, the number and variety of devices that are connected or coupled to communications networks are rapidly increasing. As such, the amount of network traffic has increased.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
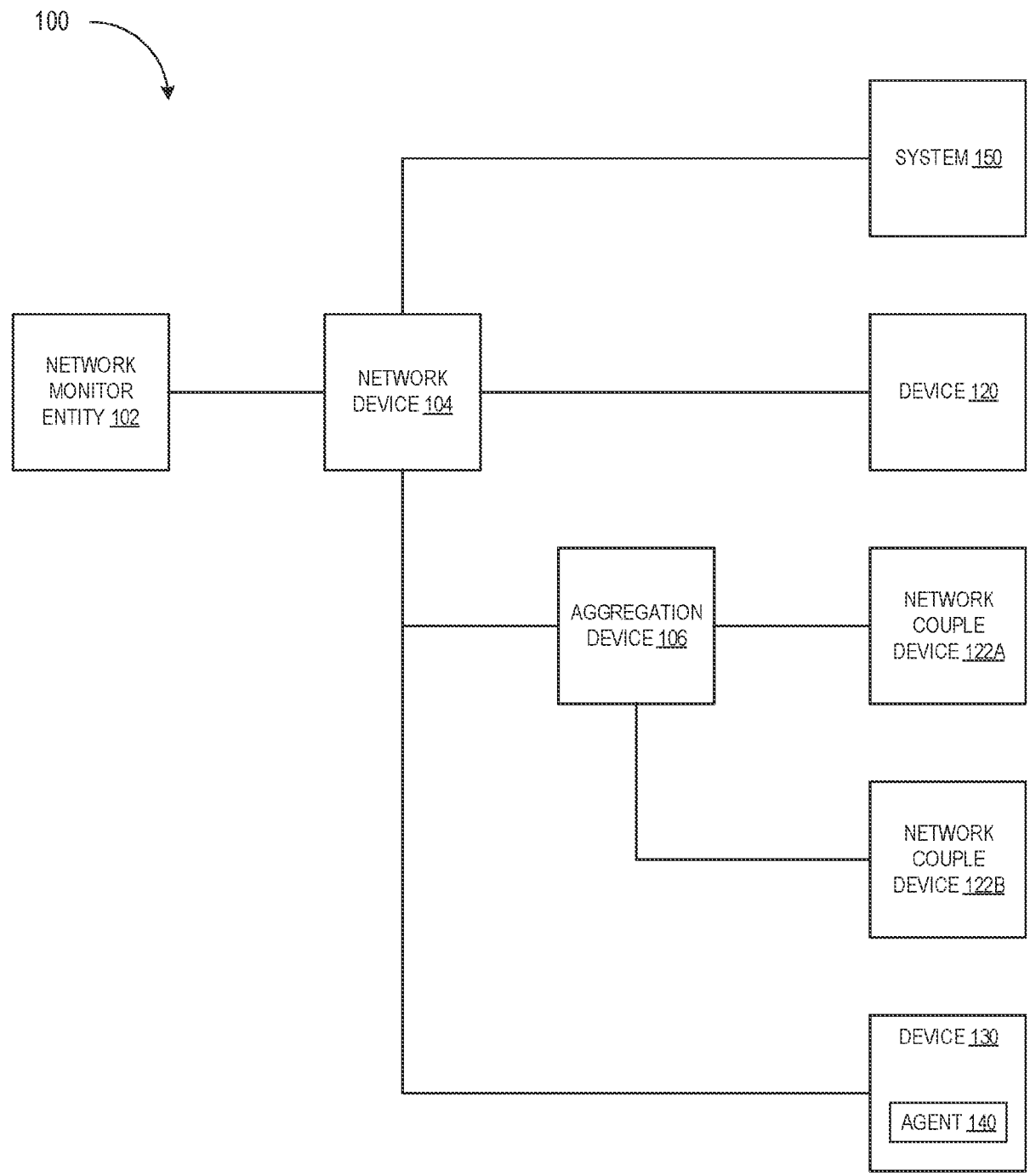
FIG. 1 depicts an illustrative communication network in accordance with one implementation of the present disclosure.

Aspects and implementations of the present disclosure are directed to mapping network traffic in an agentless manner. The systems and methods disclosed can be employed with respect to network security, among other fields.

Network traffic information can include a data (e.g., a file or data stream) that describes communications to and/or from devices on a network. Networked devices can transmit packets of data to each other over the network. Such packets can have a header and payload which can vary in format depending on which communication protocol is used. Network traffic information can be used to manage a network automatically and/or with human interaction. Some network traffic information may indicate bottlenecks in the network. Some network traffic information may be used to adjust the architecture of a network, by increasing or placing additional security in a network path. As such, network traffic analytics (analysis of network traffic information) is a fundamental technology that is vastly used in the cyber security landscape.

Some existing network traffic solutions collect network traffic information based on software agents. A software agent may reside on an endpoint device of a network and actively monitor traffic on that endpoint. The software agent may communicate the network traffic information to another device on the network where that information is aggregated or analyzed. Such agents, however, may consume extensive endpoint resources. Further, a network may have many endpoint devices with different hardware, software, operating systems, and other functionality. An agent that works on one endpoint device may not be suitable for another endpoint device. Further, some endpoints such as IoT devices, smart devices, or other unmanaged devices may not support or allow agents. Thus, some effort may be drawn towards determining compatibility and coverage of agents for a variety of different endpoint devices on a given network.

Network devices such as, for example, a firewall, a switch, a router, or other network device, may collect or aggregate network traffic. In such a solution, each network device could potentially monitor a limited footprint of traffic that flows through the network device. As such, significant effort may be drawn towards the network architecture (e.g., arrangement of network devices) to provide a sufficient coverage for gathering network traffic. If a change to the network architecture is desired, this coverage may be reduced and additional effort may be put forth to correct such deficiency. Thus, relying solely on a network device for network traffic may be cumbersome and inefficient. Further, such a solution may communicate a large volume traffic across the network to cover Layer 3 (segment to segment) traffic without having visibility of Layer 2 (intrasegment) traffic.

Accordingly, systems, methods, techniques, and related technologies, are described herein in various implementations that support network traffic mapping without relying on agents on endpoint devices. Network traffic information can be pulled from each managed endpoint device on a server without agent involvement or interaction. An agent can be understood as software that resides on a host machine (e.g., an endpoint) and performs one or more tasks autonomously, such as, gathering network traffic information of the machine on which the agent resides, and sending this information to another machine. Agentless network traffic mapping can include gathering and mapping network traffic information without the presence or help of such agents on the endpoints, for example, by accessing an operating system (OS) interface of each of the endpoints on a network and using each OS interface to obtain network traffic information of each of the endpoints. In some cases, this information can also be pulled from internet of things (IoT) devices. Network traffic mapping can be built for Layer 2 and/or Layer 3 network traffic. Such capability is beneficial towards gaining visibility and gathering in-segment traffic which is not visible under existing network traffic solutions without an agent installed on the endpoint. In such a manner, embodiments of the present disclosure can provide functionality that is comparable to the agent-based approach, but with a minimal footprint on the endpoint and reduced preliminary requirements such as agent-device compatibility.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including generating system maps for network systems in a network, as described herein. Network monitor entity 102 can generate these system maps based on metadata associated with or obtained from network traffic. In some embodiments, network monitor entity 102 can use local resources (e.g., processing, memory, data resources, or other resources), cloud resources, or a combination thereof for generating these network maps. In various embodiments, various libraries may be used to generate these system maps, as discussed in more detail below.

Network monitor entity 102 may also use additional data or other types of data to update the system maps. For example, after an initial system map is generated based on the metadata, the network monitor entity 102 may update the initial system map based on user input, packet analysis (e.g., an analysis of the payload of the network traffic or packets), etc.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 102 may poll information from a cloud service to determine where a device is communicatively coupled or connected to a network. In various embodiments, network monitor entity 102 access syslog or SNMP information from a device itself to determine where a device is communicatively coupled or connected to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and modifying classification or associated thresholds associated one or more models, as described herein. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of a device, changing the virtual local area network (VLAN), sending an email, sending a short message service (SMS) message, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 maybe communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to network monitor entity 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor entity 102. It is appreciated that log information may be particularly reliable for stable network environments (e.g., where the types of devices on the network do not change often). The log information may include information of updates of software of network coupled devices 122a-b.

Figure 2:
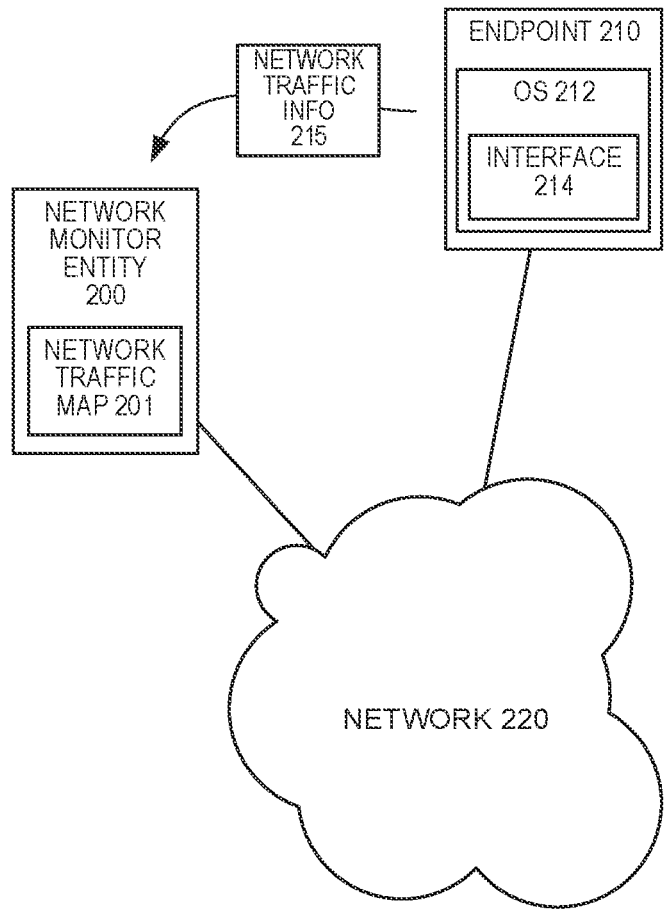
FIG. 2 depicts an illustrative computer network with network traffic monitoring in accordance with one implementation of the present disclosure.

FIG. 2 depicts an illustrative computer network with network traffic monitoring in accordance with one implementation of the present disclosure. A computer network 220 can have one or more endpoints 210 communicatively coupled to the network. Endpoint 210 can be a managed device, which can be understood as a device that can authenticate access rights to resources or functionality of the endpoint (e.g., access by network monitor entity 200). The endpoint may have an operating system (OS) 212 that can authenticate a remote system (e.g., network monitor entity 200) and allow the remote system to access resources or functionality of the endpoint. In some embodiments, endpoint 210 may be a managed device that is managed by network monitor entity 200. As such, a managed device can be understood as an endpoint that has an operating system, although not necessarily.

The endpoint may have an OS interface 214 that is accessible to a remote system (e.g., network monitor entity 200 or another remote system) after that remote system has been authenticated. An OS interface can be an application programming interface (API) or other remotely accessible handle that a remote system can commandeer to control endpoint 210 remotely (e.g., and to send one or more commands and receive one or more responses). Such control can be limited depending on the functionality of the OS interface.

A network monitor entity 200, which may be an example/implementation of network monitor entity 102, may be communicatively coupled to network 220. Network monitor entity 200 may detect one or more managed devices such as endpoint 210 that are on network 220. Network monitor entity may use one or more discovery protocols such as, for example, Simple Network Management Protocol (SNMP), Link Layer Discovery Protocol (LLDP), ping, and/or other discovery protocols.

Once discovered, the network monitor entity 200 may access the operating system (OS) interface of each of the one or more managed devices. Depending on the OS, the OS interface 214 may vary. For example, if endpoint 210 has a Mac OS or Linux-based OS, the network monitor entity may access or use secure shell (SSH) as the OS interface 214. Similarly, if endpoint 210 is a Windows-based OS, the network monitor entity may access or use Windows Management Instrumentation (WMI) as the OS interface 214. The OS interface 214 may be a native API or application that the OS allows access to once a remote system is authenticated. The OS interface 214 can have access to network traffic information of its endpoint device, and functionality whereby the remote system can gather the network traffic information. For example, the OS interface 214 may have one or more calls that the network monitor entity may call upon to gather the network traffic information 215 of the endpoint 210. In some examples, the OS interface may include a command-line network utility such as 'netstat' or an equivalent application that can be called upon by the network monitor entity 200 to gather and send the network traffic information 215 of the endpoint 210 to the network monitor entity 200.

The network monitor entity 200 may authenticate itself with an endpoint using one or more credentials. For example, the network monitor entity 200 may use a password, a cryptographic key, or other credential.

Network traffic information 215 can include a local connection address and a remote connection address, which can also be understood as a source address and destination address, respectively. The local connection address can include an IP address and/or port number of endpoint 210.

The remote connection address can include an IP address, a URL, a port number, and/or other internet address. Network traffic information 215 can include a list of communications, each communication having a local connection address and remote connection address. Each communication can also have a protocol type, such as TCP, UDP, or other protocol. Each communication can also have a state such as, for example, LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, or CLOSED.

In such a manner, the network monitor entity 200 may obtain the network traffic information 215 from each of the one or managed devices 210 without having an agent residing on each of the one or more managed devices. As discussed, deployment of agents may require significant effort to manage among various network devices, while also consuming resources on the endpoint on which the agent is installed.

The network monitor entity 200 may generate a network traffic map 201 based on the network traffic information 215 from each of the one or more managed devices. The network traffic map may show entities, network devices, endpoints (managed or unmanaged), communication channels between the network devices, entities and endpoints, and communications (e.g., packets or messages) between such devices, as described further in other sections. In some examples, for unmanaged devices, network traffic may be gathered through passive monitoring (e.g., via a SPAN port).

Figure 3:
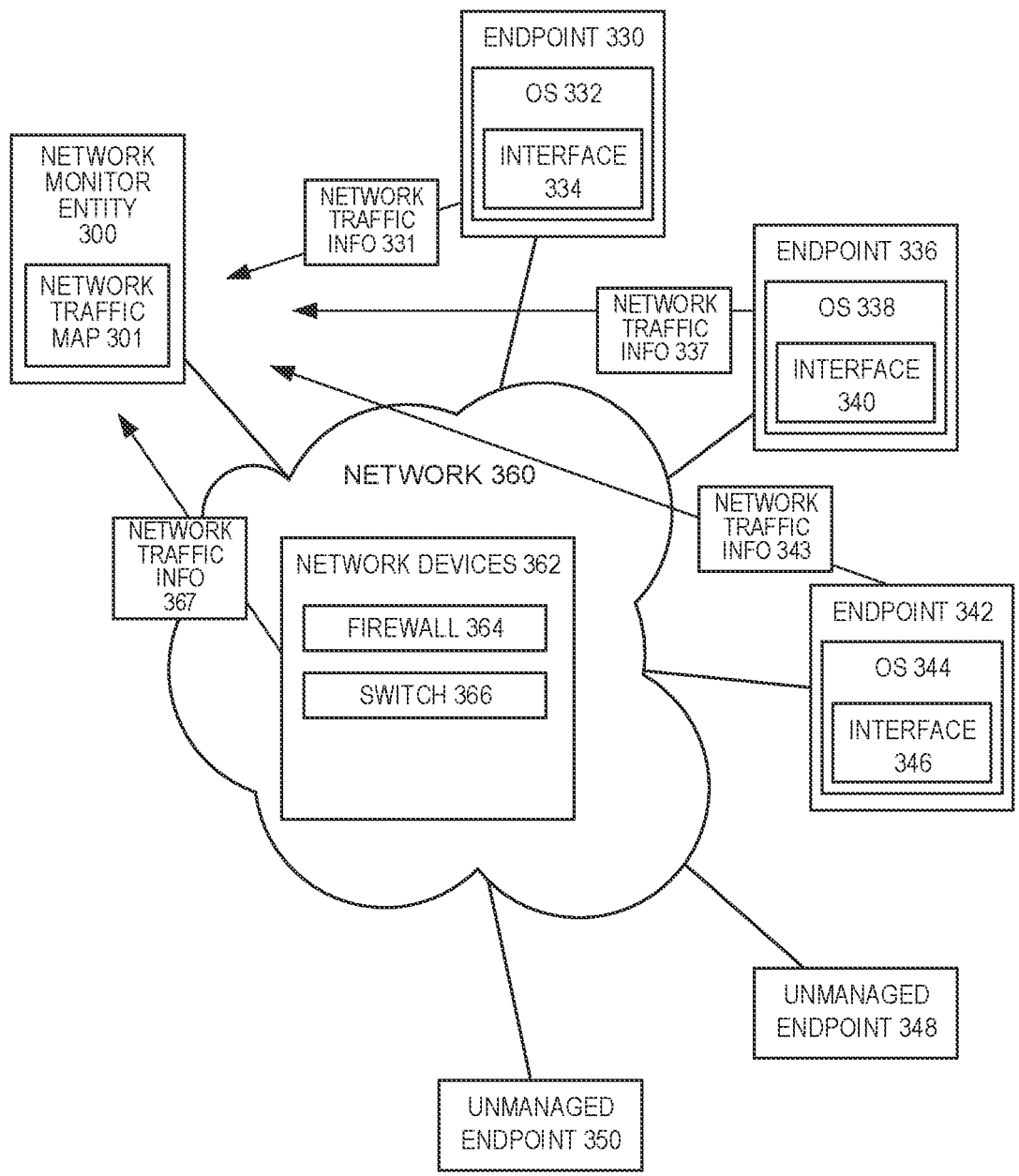
FIG. 3 depicts an illustrative computer network with a plurality of endpoints in accordance with one implementation of the present disclosure.

FIG. 3 depicts an illustrative network topology with a plurality of endpoints in accordance with one implementation of the present disclosure. A network 360 may have one or more enforcement points. An enforcement point can be one or more of network devices 362 such as, for example, a firewall 364 and/or switch 366.

Network monitor entity 300, which may be an example/implementation of network monitor entity 102, may be communicatively coupled to network 360. Network monitor entity 300 may detect one or more devices such as endpoints 330, 336, 342, 348, and/or 350, that are on network 360, using one or more discovery protocols. Endpoints 330, 336, and 342 may each have respective operating systems 334, 338, and 344. Each of the operating systems may have respective interfaces such as interface 334, 340, and 346 respectively. Network monitor entity 300 may obtain network traffic information 331, 337, and 343 from respective endpoints 330, 336, and 342, by accessing each of their respective OS interfaces, as described.

Network monitory entity 300 may generate network traffic map 301 to show each of the discovered endpoints and the network traffic into and out of each endpoint. Network monitor entity 300 may discover network devices 362 that are part of network 360, and may further generate or modify network traffic map 301 that includes such devices.

In some embodiments, the network traffic information 331,337, or 343 may include Layer 2 (data link layer) network traffic and Layer 3 (network layer) network traffic. Layer 2 network traffic can include segment to segment network traffic. Layer 3 network traffic can include intrasegment or intrazone traffic. This network traffic information can be gathered directly from the endpoints 330, 336, 342 without help from an agent, and without relying on network devices.

For example, if endpoint 336 and endpoint 342 are in the same segment, then a network device such as a firewall or switch may not 'see' communications between these endpoints because such devices may not typically pass Layer 3 network traffic. Without agents installed on the endpoints, the network monitor entity 300 may access the OS interface of endpoint 336 and OS interface of endpoint 342 to gather their respective network traffic information. Such information may contain all network traffic of that endpoint, including Layer 2 and Layer 3.

Unmanaged endpoints such as endpoint 348 and 350 may not have an OS, an OS interface, or other functionality for the network monitor entity to access. Further, unlike endpoints 330, 336, 342, endpoints 348 and 350 may not store network traffic locally. These endpoints may be IoT devices with limited processing and functionality. In the case of unmanaged endpoints or other endpoints without such network traffic gathering capabilities, the network monitor entity 300 may obtain network traffic information 367 of these devices that are connected to the network. The network monitor entity may obtain this information from one or more network devices 362 which may be configured to capture this traffic information and send this information to network monitor entity 300 upon request (e.g., via port mirroring, SPAN port, or via another method).

In such a manner, network monitor entity 300 may discover managed and unmanaged endpoints without use of an agent, and with minimal reliance on network devices 362. For those endpoints that are managed such as 330, 336, and 342, network monitor entity 300 can authenticate itself and gather network traffic info by using the respective OS interface of each managed endpoint. For endpoints such as 348 and 350 that are not managed or otherwise lack such network gathering capabilities, the network monitor entity 300 can obtain their network traffic information from firewalls, switches, and/or other network devices on the network. The network monitor entity 300 can generate the network traffic map 301 based on the network traffic information 331, 337, 343, and 367 from each of the one or more managed devices and/or the network traffic information from each of the unmanaged devices on a case-by-case basis.

It should be understood that FIG. 3 shows example endpoints and network devices and it is appreciated that more or fewer network devices, endpoints, or other entities may be used in place of those shown. Example endpoint devices may be any of a variety of devices or entities (e.g., smart devices, multimedia devices, networking devices, personal computers, accessories, mobile devices, IoT devices, retail devices, healthcare devices, etc.), as described herein. Enforcement points including firewall 364 and switch 366 may be any device (e.g., network device 104, cloud infrastructure, etc.) that is operable to allow traffic to pass, drop packets, restrict traffic, etc. Network monitor entity 300 may be any of a variety of network devices or entities, e.g., router, firewall, an access point, network access control (NAC) device, intrusion prevention system (IPS), intrusion detection system (IDS), deception device, cloud-based device or device, virtual machine based system, etc. Network monitor entity 300 may be substantially similar to network monitor entity 102. Embodiments support IPv4, IPv6, and other addressing schemes. In some embodiments, network monitor entity 300 may be communicatively coupled with firewall 364 and switch 366 through additional individual connections (e.g., to receive or monitor network traffic through firewall 364 and switch 366, for instance via a port mirroring interface, SPAN port, or via another method).

In some embodiments, network monitor entity 300 may communicate with a network device such as a firewall and/or switch or other enforcement point to limit or restrict communication of at least one of the one or more managed network devices, in response to the network traffic information. For example, if endpoint 330 is communicating an unexpected volume of messages to endpoint 336 or is otherwise violating a rule, network monitor entity may send a request to a firewall to limit or restrict further communications from endpoint 330 to endpoint 336.

In some embodiments, network monitor entity 300 may cause a process to end on at least one of the one or more managed network devices, in response to the network traffic information. For example, if endpoint 342 is communicating an unexpected volume of messages or is otherwise violating a rule or policy, then network monitor entity 300 may cause a process on endpoint 342 to end by accessing an OS interface of endpoint 342. This may be the same or a different OS interface than the OS interface used to gather the network traffic information. Network monitor entity 300 may take remedial measures such as restricting traffic or ending processes automatically or based on input from a user, and other measures as described herein.

Figure 4:
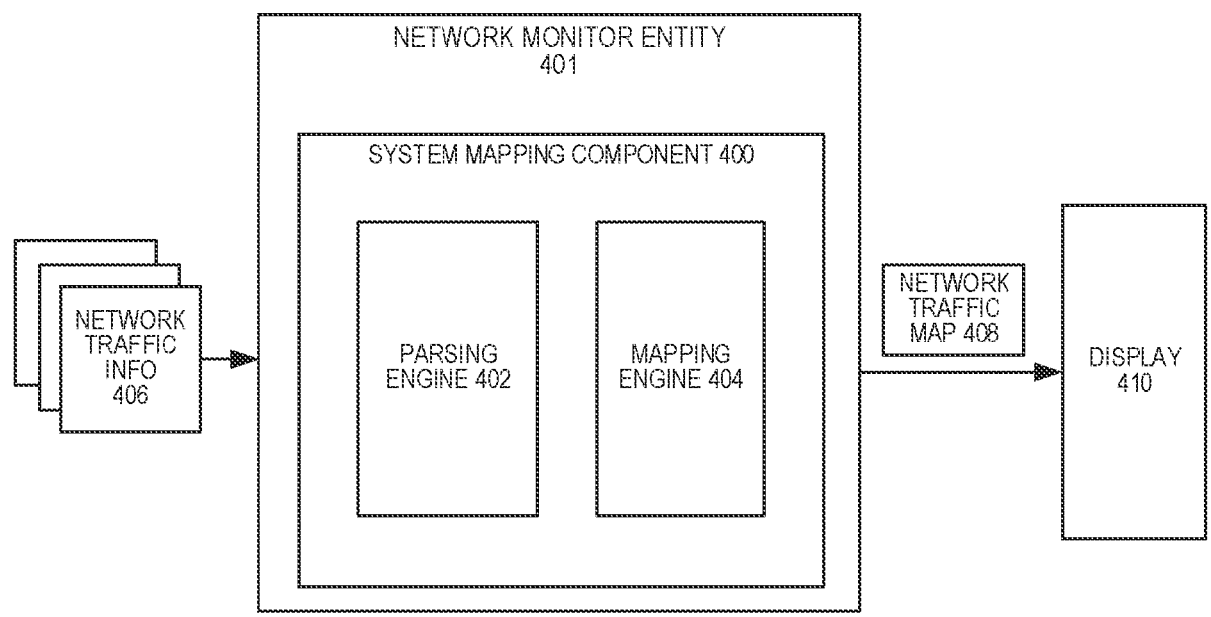
FIG. 4 depicts a block diagram of a system for generating network system maps in accordance with one implementation of the present disclosure.

FIG. 4 depicts a block diagram of a system for generating a network traffic map in accordance with one implementation of the present disclosure. A network monitory entity 401, which can represent the network monitor entity described in other sections, can include system mapping component 400 that discovers network devices and endpoints, obtains network traffic information 406, and generates a network traffic map 408. The system mapping component 400 may be located on or may be part of a network monitor entity 102, 200 or 300, as described in other sections. Network monitor entity 401 may present a visual representation of the network traffic map 408 to a display 410.

The network monitor entity 401 may monitor a variety of protocols and entities or devices. Network monitor entity 401 may be operable for a variety of tasks including parsing network traffic information to build communication lines or edges (e.g., of a graph) that connect each of the end points, entities or devices.

Further, a network monitor entity 401 may determine one or more enforcement points where a device is communicatively coupled to the network and thereby determine the one or more enforcement points closest to the device. In various embodiments, network monitor entity 401 may access a current configuration of the one or more enforcement points to determine the access rules (e.g., ACLs) that are to be applied to the one or more enforcement points. Network monitor entity 401 may then apply or assign the access rules to the one or more enforcement points closest to the device. In some embodiments, system mapping component 400 may be located on another device separate from network monitor entity 401. The system mapping component 400 may include a parsing engine 402, and a mapping engine 404.

In some embodiments, the system mapping component 400 may obtain or access network traffic information directly from endpoint devices using native OS interfaces residing on each of the endpoint devices. For devices without such capabilities, the system mapping component 400 may obtain the network traffic information from network devices such as, for example, a switch, firewall, router, or other network device, as described herein.

In some embodiments, the parsing engine 402 may parse (e.g., analyze, read, decode, decipher, process, etc.) network traffic information such as messages, packets, frames, portions thereof, etc. For example, the parsing engine 310 may analyze or parse a file (e.g., a JSON file) or a data stream containing network traffic information. Network traffic information can define communications into or out of a device over a given time over one or more communication channels. Such a file can be retrieved and parsed for each of the managed endpoints.

In some embodiments, the mapping engine 404 may generate a network traffic map for the network. The network traffic map may identify the devices (e.g., entities) that are part of the network. For example, the system map may identify servers, databases or data storage devices, client devices, etc., that are part of the network. The network traffic map may also indicate interconnections or communicative couplings between different devices (e.g., how different devices are coupled to each other). For example, for each device, the network system map may indicate, illustrate, etc., all of the devices that the respective device is coupled to. Mapping engine 404 can generate network traffic map 408 by indicating entities, devices, and endpoints of the network, and making edges (e.g., of a graph) between each of the entities, devices, and endpoints as defined by the network traffic information. For example, if an endpoint is connected to a switch, then an edge can be made between the switch and the endpoint. If an endpoint communicates with another endpoint, an edge can be made between the two endpoints. The mapping engine may generate the visual representation of the network traffic map 408 by rendering each of the entities, devices, and/or endpoints, for example, as nodes. Text, color, and/or shape can be used to indicate the type of node (e.g., to identify the type of entity, device or endpoint) and the type of edge (e.g., a communication channel or a communicated message).

After generating the network traffic map 408 (e.g., an initial system map), the network monitor entity may obtain additional network traffic information 406 periodically. The parsing engine 402 may parse the network traffic information and the mapping engine 404 may use the parsed network traffic information to update the network traffic map 408.

In some embodiments, the mapping engine 404 may perform analysis of the flow of the network traffic, which can be understood as network flow analysis. For example, the mapping engine 404 may monitor how different packets flow between different devices (e.g., how a packet is forwarded from one device to another, how a device responds to a packet that is received, etc.). This may allow the mapping engine 404 to identify devices that may be part of a network. For example, if a packet from a first device is forwarded through two other devices before reaching a destination device, the mapping engine 404 may be able to analyze this flow of packets to identify the first device, the destination device, and the two other devices as being part of the network. Various existing flow analysis modules, components, systems, etc., may be used by the mapping engine 404.

In some embodiments, the mapping engine 404 may receive input (e.g., user input) and may generate or update a network system map based on the input. For example, a user may provide user input (to the mapping engine 404) indicating that a device should be added to the network system map for a network system. In another example, a user may provide user input updating a network system role for a device in a network system map.

In another embodiment, the mapping engine 320 may use other inputs and/or data to generate a network system map. For example, the mapping engine 404 may use classifications provided by other modules, systems, components, etc., to identify devices, network system roles, etc. In another example, the mapping engine 404 may use domain name service (DNS) names to identify devices or network systems. For example, the DNS of a device may be used to identify a network system role. In a further example, the vendor or manufacturer of a device may be used to identify a network device or a network system. For example, a vendor or model number of a device may be used to determine a network system role for a device.

Figure 5:
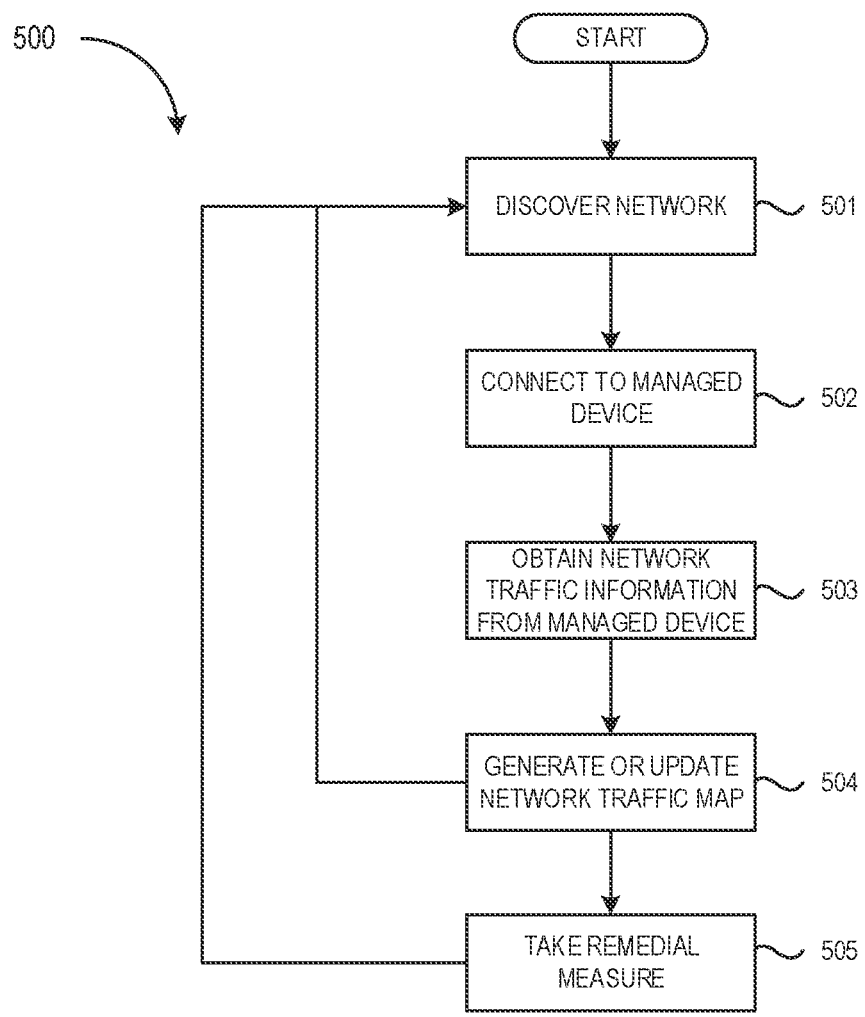
FIG. 5 depicts a process for generating network system maps in accordance with one implementation of the present disclosure.

FIG. 5 depicts a flow diagram of aspects of process 500 for generating network system maps, in accordance with one implementation of the present disclosure. Some or all of process 500 may be performed by one or more components (e.g., components of system 600) of an entity or device (e.g., network monitor entity 102, 200, 300, 401, system mapping component 400, etc.).

At block 501, the process includes discovering the network. This can include, for example, detecting one or more managed devices that are connected to a network. Other endpoints such as unmanaged devices can also be detected on the network. The discovery process can utilize one or more discovery protocols, as described in other sections.

At block 502, the process includes connecting to one or more managed devices. The process can include accessing an operating system (OS) interface of each of the one or more managed devices. For example, the process may include connecting to a managed device (e.g., over a communication port), providing authentication to the managed device, and taking control of the OS interface (e.g., WMI, SSH, or other interface) remotely.

At block 503, the process includes obtaining network traffic information from the one or more managed devices. Each OS interface can be used to obtain network traffic information from each of the one or more managed devices. An OS interface can include one or more calls that when called upon, will send network traffic information of that endpoint back to the remote caller (e.g., the network monitor entity). In some examples, network traffic information can also be gathered from unmanaged endpoints or other endpoints without such OS interface capabilities. This network traffic information from such endpoints may be obtained from one or more network devices which may be configured to capture this traffic information and provide it upon request (e.g., via port mirroring, SPAN port, or via another method).

At block 504, the process includes generating or updating a network traffic map. The network traffic map can be generated or updated based on the network traffic information, as described in other sections. The process can be repeated, for example, periodically, to maintain an updated network traffic map.

At block 505, the process can further include taking remedial measures such as, for example, restricting traffic between endpoints, ending processes, sending an electronic alert (e.g., a notification, email, SMS message, or other alert), or other remedial measure, based on the network traffic information. For example, the process can enforce one or more rules that limit the amount of traffic or defined traffic paths. When the network traffic information indicates that a rule is violated, then the process can take the remedial measure.

Figure 6:
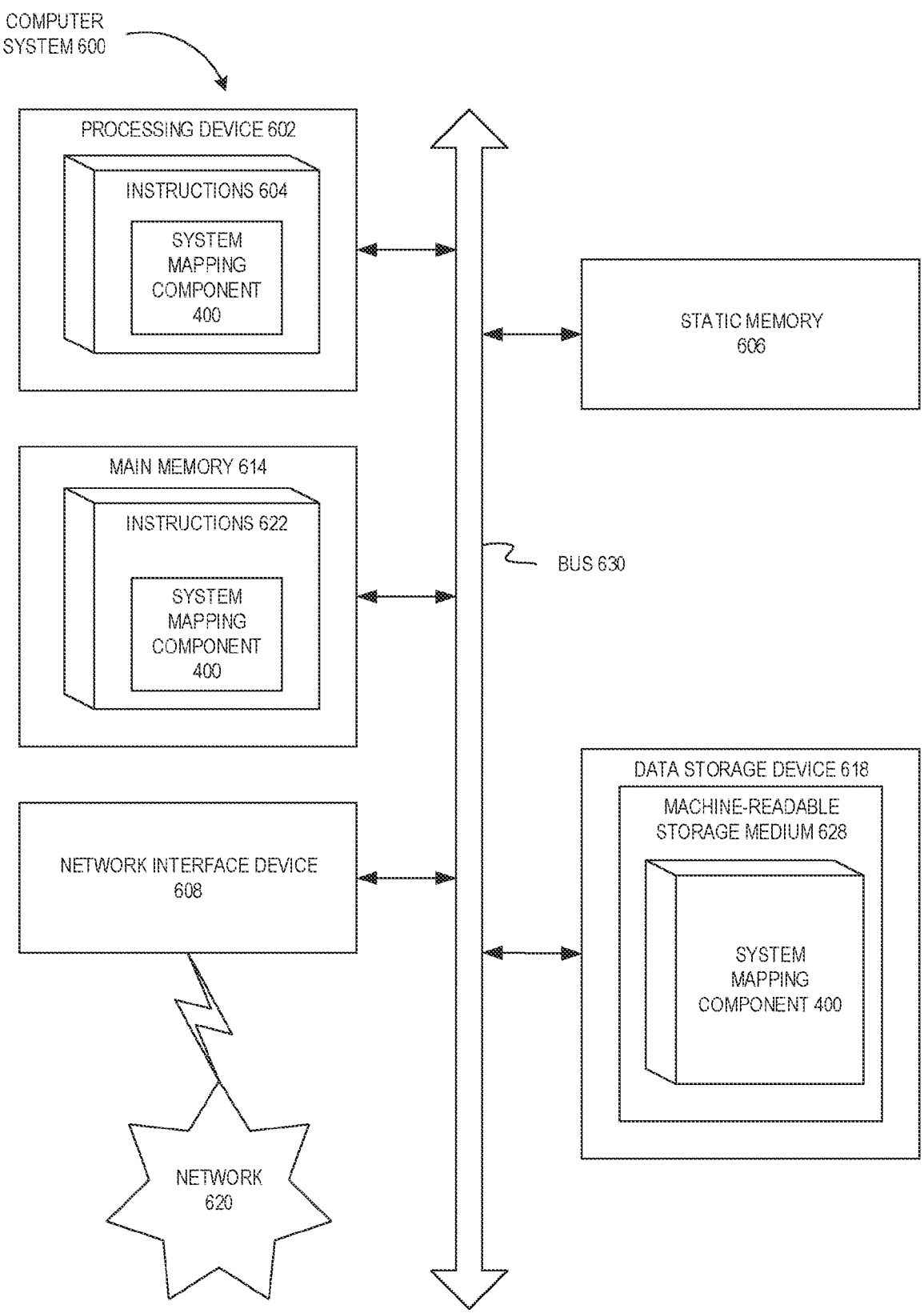
FIG. 6 is a block diagram illustrating an example computer system, in accordance with one implementation of the present disclosure.

FIG. 6 is a block diagram illustrating an example computer system 600, in accordance with one implementation of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server, such as network monitor entity 102, 200, 300, 401 running system mapping component 400 to generate network traffic maps, as described herein.

The exemplary computer system 600 includes a processing device 602, a main memory 614 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute system mapping component 400, for performing the operations and steps discussed herein.

The data storage device 618 may include a machine-readable storage medium 628, on which is stored one or more set of instructions 622 (e.g., software) embodying any one or more of the methodologies of operations described herein, including instructions to cause the processing device 602 to execute system mapping component 400. The instructions 622 may also reside, completely or at least partially, within the main memory 614 or within the processing device 602 during execution thereof by the computer system 600; the main memory 614 and the processing device 602 also constituting machine-readable storage media. The instructions 622 may further be transmitted or received over a network 620 via the network interface device 608.

The machine-readable storage medium 628 may also be used to store instructions to perform a method for generating network system maps, as described herein. The machine-readable storage medium 628 may also be used to store instructions to perform a method for updating network system maps and updating libraries, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   detecting one or more managed devices that are coupled to a network;
   accessing an operating system (OS) interface of each of the one or more managed devices;
   using each OS interface to obtain, from said each of the one or more managed devices, network traffic information that includes a local connection address and a remote connection address for each communication of the respective managed device;
   in response to detecting an unmanaged device that lacks the OS interface is coupled to the network, obtaining second network traffic information associated with the unmanaged device from a network device that captures the second network traffic information over the network; and
   generating a network traffic map based on the network traffic information from said each of the one or more managed devices and the second network traffic information that is associated with the unmanaged device.

2. The method of claim 1, wherein the network traffic information is obtained from said each of the one or more managed devices without having an agent residing on said each of the one or more managed devices.

3. The method of claim 1, wherein the OS interface includes secure shell (SSH).

4. The method of claim 1, wherein the OS interface includes Windows Management Instrumentation (WMI).

5. The method of claim 1, wherein the network traffic information includes at least one of Layer 2 network traffic information or Layer 3 network traffic information.

6. The method of claim 1, wherein the network device captures the second network traffic information over the network passively.

7. The method of claim 6, wherein the network device includes at least one of: a switch, a router, a bridge, and a firewall.

8. The method of claim 1, further comprising communicating with a network device to limit or restrict communication of at least one of the one or more managed network devices, in response to the network traffic information.

9. The method of claim 1, further comprising causing a process to end on at least one of the one or more managed network devices, in response to the network traffic information.

10. The method of claim 1, further comprising presenting a visual representation of the network traffic map to a display.

11. The method of claim 1, further comprising repeating the method periodically.

12. The method of claim 1, wherein the network traffic information is obtained as a list that includes each communication from said each of the one or more managed network devices over the OS interface.

13. A system, comprising:
    a memory; and
    a processing device, operatively coupled to the memory, to:
       detect one or more managed devices that are coupled to a network;
       access an operating system (OS) interface of each of the one or more managed devices;
       use each OS interface to obtain, from said each of the one or more managed devices, network traffic information that includes a local connection address and a remote connection address for each communication of the respective managed device;
       in response to detecting an unmanaged device that lacks the OS interface is coupled to the network, obtain second network traffic information associated with the unmanaged device from a network device that captures the second network traffic information over the network; and
       generate a network traffic map based on the network traffic information from said each of the one or more managed devices and the second network traffic information that is associated with the unmanaged device.

14. The system of claim 13, wherein the network traffic information is obtained from said each of the one or more managed devices without having an agent residing on said each of the one or more managed devices.

15. The system of claim 13, wherein the OS interface includes secure shell (SSH).

16. The system of claim 13, wherein the OS interface includes Windows Management Instrumentation (WMI).

17. The system of claim 13, wherein the network traffic information includes at least one of Layer 2 network traffic information or Layer 3 network traffic information.

18. A non-transitory computer readable medium having instructions encoded thereon that, when executed by a processing device, cause the processing device to:
    detect one or more managed devices that are coupled to a network;
    access an operating system (OS) interface of each of the one or more managed devices;
    use each OS interface to obtain, from said each of the one or more managed devices, network traffic information that includes a local connection address and a remote connection address for each communication of the respective managed device;
    in response to detecting an unmanaged device that lacks the OS interface is coupled to the network, obtain second network traffic information associated with the unmanaged device from a network device that captures the second network traffic information over the network; and generate a network traffic map based on the network traffic information from said each of the one or more managed devices and the second network traffic information that is associated with the unmanaged device.

19. The non-transitory computer readable medium of claim 18, wherein the network traffic information is obtained from said each of the one or more managed devices without having an agent residing on said each of the one or more managed devices.

20. The non-transitory computer readable medium of claim 18, wherein the network device captures the second network traffic information over the network passively.